United States Patent [19]
Kuhn et al.

[11] 3,921,062
[45] Nov. 18, 1975

[54] CIRCUIT FOR MEASURING AND STORING PEAK VALUES OF IGNITION VOLTAGE IN AN INTERNAL COMBUSTION ENGINE

[75] Inventors: Klaus Roland Kuhn; Viktor Stigler, both of Karlsruhe, Germany

[73] Assignee: Siemens Aktiengesellschaft, Munich, Germany

[22] Filed: July 8, 1974

[21] Appl. No.: 486,644

[30] Foreign Application Priority Data
July 12, 1973 Germany............................ 2335539

[52] U.S. Cl............................. 324/16 R; 324/16 S
[51] Int. Cl.[2].................. G01R 13/42; G01R 23/00; G01R 29/00
[58] Field of Search..................... 324/15, 16 R, 16 S

[56] References Cited
UNITED STATES PATENTS

| | | |
|---|---|---|
| 2,471,968 | 5/1949 | McCullough ...................... 324/16 S |
| 3,474,667 | 10/1969 | Fuchs............................ 324/16 R X |
| 3,521,156 | 7/1970 | Mueller et al. ...................... 324/15 |
| 3,551,800 | 12/1970 | Widmer............................... 324/15 |

Primary Examiner—Stanley T. Krawczewicz
Attorney, Agent, or Firm—Kenyon & Kenyon Reilly Carr & Chapin

[57] ABSTRACT

A circuit for measuring and storing peak ignition voltage values in an internal combustion engine using storage capacitors having one electrode coupled to the ignition voltage source and through switches to an evaluator unit. The first side of each capacitor is coupled to ground through a resistor and the emitter-collector path of a first transistor and the second capacitor electrode coupled to ground through the emitter-collector path of a second transistor with the bases of the two transistors coupled together through two resistors and means provided to control the first and second switching transistors in a predetermined manner.

7 Claims, 1 Drawing Figure

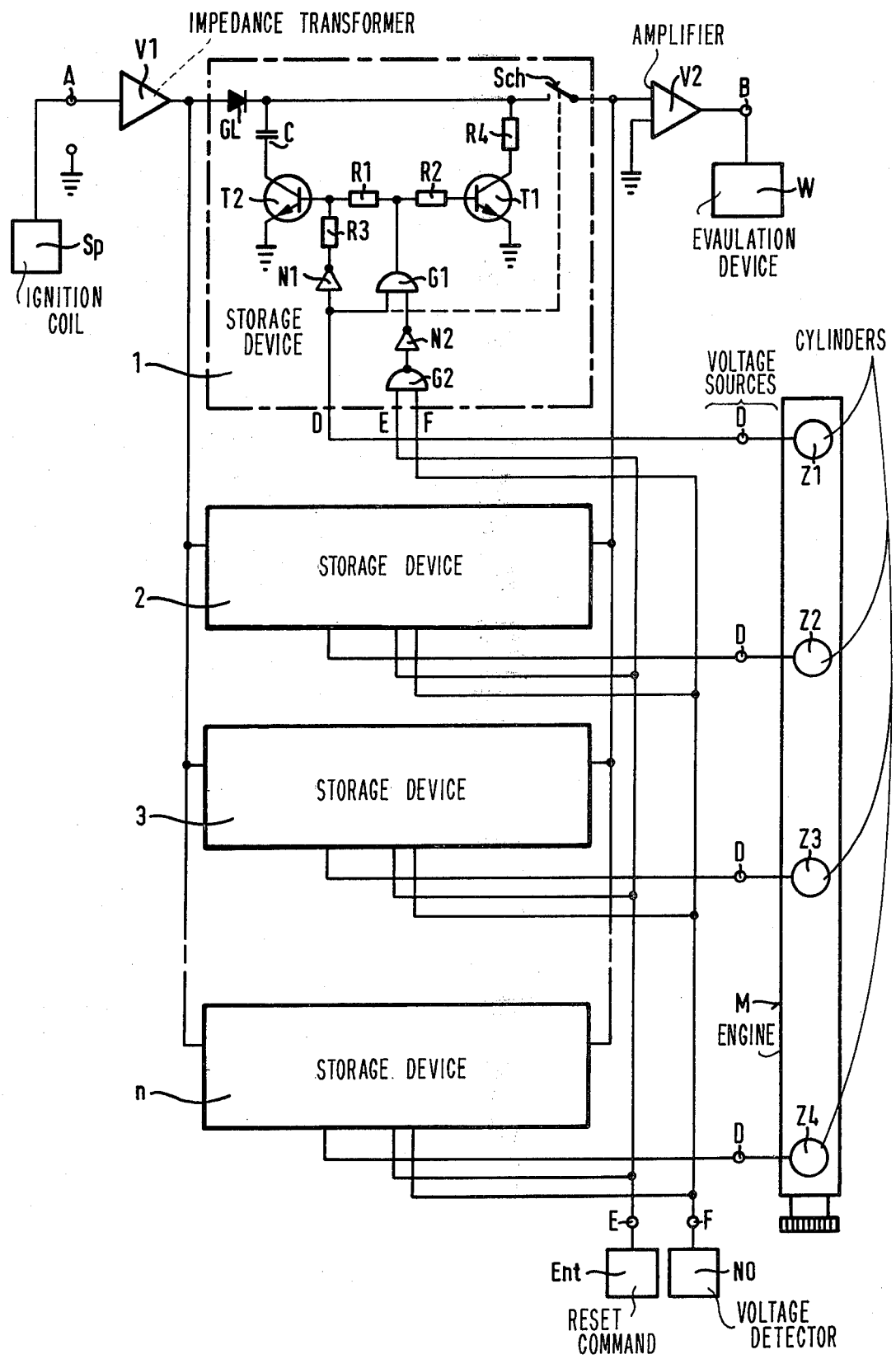

CIRCUIT FOR MEASURING AND STORING PEAK VALUES OF IGNITION VOLTAGE IN AN INTERNAL COMBUSTION ENGINE

BACKGROUND OF THE INVENTION

This invention relates to circuits for measuring and storing peak ignition voltage values in internal combustion engines in general, and more particularly to an improved circuit for this purpose.

The waveform of the voltage at the ignition coil in an internal combustion engine provides important information as to the state of the ignition system. A characteristic part of the voltage waveform is the level of what is referred to as "base voltage line." This is the voltage which builds up at the ignition coil upon the opening of the breaker points in the distributor, the buildup continuing until the breakdown at the spark gap. In order to measure the amplitude of this voltage and then to provide a digital output indicative thereof, the peak value must be stored for a sufficient period to permit an analog to digital conversion to take place. Another useful quantity for evaluating an ignition system is the maximum value of the base voltage line occurring at the same cylinder over a plurality of ignitions. If this quantity is to be measured, the level of the maximum must be stored until the desired number of ignitions has taken place and the stored value then converted to a digital quantity.

An arrangement for automatically picking up the waveform of the ignition voltage in a multi-cylinder internal combustion engine is described in German Auslegeschrift No. 2,040,913. In particular in FIG. 2, of that reference, a peak value storage device is shown designated with the reference numeral 19. As described therein, this storage device stores the ignition peak. The only teaching contained in this reference is that the storage device can be a capacitor with a small charging time constant.

With the knowledge that such peaks can be stored with such a capacitor, it is the object of the present invention to provide an optimum circuit arrangement, making it possible to store peak ignition voltage values of what is referred to as base voltage line.

SUMMARY OF THE INVENTION

The present invention provides such an optimum circuit arrangement using storage capacitors for storing the peak voltage values in an internal combustion engine. Generally, a capacitor is provided for each cylinder of the engine and one side of each capacitor is coupled to the ignition voltage source in the ignition system. The same electrode is also coupled through a switch to an evaluator unit and is also coupled to ground through a resistor and the emitter-collector path of a first switching transistor. The other electrode of the capacitor is coupled through a second switching transistor to ground and the bases of the first and second switching transistors connected with each other through two resistors in series. The base of the second switching transistor for each cylinder and a control input for both switching transistors are connecteed to respective signal sources associated with the individual cylinders of the engine with a signal source for resetting commands connected in parallel with all junction points of the resistors between the base terminals through logic elements which are simultaneously controlled by the signals associated with the individual cylinders.

The voltage peaks to be stored are applied simultaneously to all capacitors. However, the discharging and charging of each individual capacitor is controlled through the switching transistors which couple its terminals to ground. With this arrangement, the cutoff current of the switching transistor coupling the other terminal of the charging capacitor to ground causes no change in the charge. Preferably, the storage capacitors are coupled through rectifiers to the output of an impedance transformer which has its input coupled to the ignition voltage source. The bases of the second switching transistors are coupled with signal sources associated with the individual cylinders through inverters.

A further feature of the invention is found in the use of an AND gate having its output coupled to the junction point of the two resistors coupling the bases of the first and second switching transistors. This AND gate has one input coupled to a signal source associated with a cylinder and another input coupled to the output of a second AND gate or through an inverter to the output of a NAND gate having one input coupled to the signal source for resetting commands. The other input of this latter gate, i.e., the NAND gate, is coupled to the output of a zero voltage detector detecting the ignition voltage.

BRIEF DESCRIPTION OF THE DRAWINGS

The single FIGURE is a block-schematic diagram of a circuit arrangement according to the present invention.

DETAILED DESCRIPTION OF PREFERRED EMBODIMENT

As shown on the FIGURE, the ignition coil Sp is connected to a terminal A or to ground. The terminal A comprises an input to an impedance transformer V in the form of an operational amplifier V1 having a high input impedance and a low output impedance. The output of amplifier V1 is coupled through a diode G1 to one terminal of a capacitor C. Shown on the FIGURE are four blocks 1 through N, with only block 1 shown in detail. It will be recognized that the blocks 2, 3 . . . N will have identical components to those shown in block 1. Each of the blocks comprises a storage device for one of the cylinders. The only difference is in the specific control signals provided thereto as will be explained in more detail below. Typically, one block of this nature with the illustrated circuit therein will be provided for each cylinder of the engine. The other terminal of the capacitor C is coupled through the collector emitter path of a second switching transistor T2 to ground. The one terminal of the capacitor C to which the input voltage is provided through the diode GL is coupled through a resistor R4 and a first switching transistor T1 to ground. This one terminal of the capacitor is also coupled through a switch Sch to a second amplifier V2 having an output terminal B. The output terminal B is coupled to an evaluation device W which may comprise an analog to digital converter. The bases of transistors T1 and T2 are coupled together through resistors R1 and R2 in series.

It will be recognized that in order for the capacitor C to be charged the transistor T2 must be turned on to close a path to ground. For measurement after charging, the switch Sch must be closed to provide the output to the amplifier V2 and the evaluation device W. Thereafter, transistor T1 must be turned on to close a path to ground to discharge the capacitor C. At this point, during discharging, both transistors T1 and T2 must be on. It will also be recognized that the transistor T2 must also be turned on during the evaluation process when the switch Sch is closed.

A voltage source D providing a voltage associated with each individual cylinder Z1 through Z4 of the engine M has an appropriate output provided as an input through an inverter N1 and resistor R3 to the base of the transistor T2. The junction of the resistors R1 and R2 has as an input the output of AND gate G1. AND gate G1 has as a first input the signal D which is the input to the inverter N1. Its second input is obtained from a second inverter N2. The input to inverter N2 is from a NAND gate G2 having as inputs the signals designated E and F. Signal E is obtained from a device ENT which provides the output E as a discharge or reset command. The signal F is provided as the output of a zero voltage detector NO arranged to detect a zero ignition voltage and provide an output indicative thereof. (Note that NAND gate G2 and inverter N2 together are equivalent to an AND gate).

As shown, with the exception of the signal D associated with each of the individual cylinders, all signals are coupled in parallel to each of the units 1, 2 through N. One signal D is of course, provided for each cylinder of the engine. In operation, the signal D associated with the cylinder ready for firing is coupled to ground. This signal when inverted through the inverter N1 results in a logic 1 or positive signal being provided to the base of the transistor T2 turning on that transistor and coupling the capacitor C to ground. As the ignition voltage builds up, it is provided to the capacitor causing the capacitor to charge. Only the one cylinder which is ready for firing will have its output D at ground level and thus only the capacitor C associated with that cylinder will be charged from the output of the amplifier V1 through its associated diode GL. As shown by the dotted line, this input is also coupled to the switch Sch which, although shown as a mechanical switch, will preferably be an electronic switch such as a FET switch. Thus, the zero level on the input D will result in the switch Sch associated with the cylinder ready for firing to be closed. The capacitor C will charge to the peak value with any discharge being prevented by the diode GL. This peak value will be coupled through the switch Sch and the amplifier V2 to the terminal B from which it may be evaluated by the evaluation circuit W, i.e., it may be digitized by an analog to digital converter. During the charging process, the signals D and F will both be at the 0 level. These two zeros into NAND gate G2 will result in a 1 output therefrom. This 1 output will be inverted in the inverter N2 to provide a 0 input to the AND gate G1. The gate G1 will have a corresponding 0 output causing transistor T1 to be in a cutoff state during the charging process and evaluation.

For the discharging or resetting of the storage device, both switching transistors T1 and T2 must be turned on. Because of the coupling of the bases fo transistors T1 and T2 through the resistors R1 and R2, a signal is applied to the junction thereof will turn on both transistors at once. This turning on is accomplished in response to the signal E indicating that a discharging or reset is required. In addition however, before the transistors are turned on, it is desired that the ignition voltage be zero. By insuring this fact, an existing measuring voltage is prevented from being shorted through one of the rectifiers GL and one of the transistors T1 to ground. Thus, the signal F must also be present before discharging is accomplished. In order to assure that both signals are present NAND gate G2 is used. Only if both the signal E and the signal F are 1 will the output of gate G2 be a 0. This 0 when inverted through the inverter N2 results in a 1 at the input of G1. With two 1s at its input, gate G1 will have a 1 or positive output and will insure that both transistors T1 and T2 are turned on to discharge capacitor C. The device for providing the output signals D may simply be a counting device supplying an output signal in accordance with the firing order of the internal combustion M.

Thus, an improved circuit for measuring and storing peak ignition voltage values in an internal combustion engine has been shown. Although specific embodiments have been illustrated and described, it will be obvious to those skilled in the art that various modifications may be made without departing from the spirit of the invention which is intended to be limited solely by the appended claims.

What is claimed is:

1. A circuit for storing peak ignition voltage values in an internal combustion engine comprising
   a. a plurality of capacitors all having one electrode coupled in parallel to an ignition voltage source;
   b. a plurality of first switching transistors coupling said one electrode of corresponding ones of said capacitors to ground through their collector emitter path;
   c. an equal plurality of reesistors between said electrodes and said first switching transistors;
   d. an evaluator unit;
   e. A plurality of switches coupling said respective one terminals to said evaluator unit;
   f. a plurality of second switching transistors coupling the respective other terminals of said capacitors to ground;
   g. a plurality of second and third resistors coupling the bases of respective ones of said first and second switching transistors;
   h. means for providing a plurality of signals one associated with each individual cylinder of the engine, said plurality of signals being coupled to the bases of the respective second switching transistors and as control inputs to respective ones of said switches;
   i. a plurality of logic elements each having an output coupled to the junction of a respective second and third resistors, and each having as a first input a respective output of said means providing a plurality of signals; and
   j. means for providing a reset signal, said means having its output coupled as second input to all of said plurality of logic elements.

2. A circuit according to claim 1 wherein said bases of said second switching transistors are coupled to the said plurality of signals through a plurality of respective inverters.

3. A circuit according to claim 1 wherein said capacitors are coupled to said ignition voltage source through an impedance transformer and a rectifier.

4. A circuit according to claim 3 wherein said bases of said second switching transistors are coupled to the said plurality of signals through a plurality of respective inverters.

5. A circuit according to claim 1 wherein each of said logic means comprise:
   a. first AND means having its output coupled to the junction of a second and third resistors and having one input coupled to a respective one of said plurality of signals;
   b. second AND means having its output coupled as the second input to said first AND means and having as a first input the output of said means providing a reset signal; and
   c. zero voltage detection means adapted to sense a zero level in said ignition voltage having its output coupled as a second input to said second AND means.

6. A circuit according to claim 5 wherein said bases of said second switching transistors are coupled to the said plurality of signals through a plurality of respective inverters.

7. A circuit according to claim 6 wherein said capacitors are coupled to said ignition voltage source through an impedance transformer and a rectifier.

* * * * *